US009330443B1

(12) United States Patent
Zou et al.

(10) Patent No.: US 9,330,443 B1
(45) Date of Patent: May 3, 2016

(54) NOISE REDUCTION IN IMAGE DOMAIN FOR SPECTRAL COMPUTED TOMOGRAPHY

(71) Applicants: KABUSHIKI KAISHA TOSHIBA, Tokyo (JP); TOSHIBA MEDICAL SYSTEMS CORPORATION, Tochigi (JP)

(72) Inventors: Yu Zou, Naperville, IL (US); Dan Xu, Vernon Hills, IL (US); Sachin Moghe, Northbrook, IL (US)

(73) Assignees: KABUSHIKI KAISHA TOSHIBA, Tokyo (JP); TOSHIBA MEDICAL SYSTEMS CORPORATION, Tochigi (JP)

( * ) Notice: Subject to any disclaimer, the term of this patent is extended or adjusted under 35 U.S.C. 154(b) by 0 days.

(21) Appl. No.: 14/622,408

(22) Filed: Feb. 13, 2015

(51) Int. Cl.
  *G06K 9/00* (2006.01)
  *G06T 5/00* (2006.01)
  *G06T 5/50* (2006.01)

(52) U.S. Cl.
  CPC . *G06T 5/002* (2013.01); *G06T 5/50* (2013.01); *G06T 2207/10004* (2013.01); *G06T 2207/10081* (2013.01)

(58) Field of Classification Search
  None
  See application file for complete search history.

(56) References Cited

U.S. PATENT DOCUMENTS

| 2012/0087565 A1* | 4/2012 | Garud | G06T 5/002 382/132 |
| 2012/0224760 A1* | 9/2012 | Goshen | G06T 5/003 382/131 |
| 2014/0126685 A1* | 5/2014 | Deuerling-Zheng | A61B 6/4441 378/4 |

FOREIGN PATENT DOCUMENTS

DE  WO 2014177953 A1 * 11/2014  ............. G06T 5/002

* cited by examiner

*Primary Examiner* — Bhavesh Mehta
*Assistant Examiner* — Oneal R Mistry
(74) *Attorney, Agent, or Firm* — Oblon, McClelland, Maier & Neustadt, L.L.P.

(57) ABSTRACT

A computed tomography (CT) imaging system is provided including processing circuitry configured to obtain a plurality of basis images that are combined to generate a target image; de-noise the basis images using a noise-reduction method to generate de-noised basis images; calculate noise maps of the basis images by subtracting the de-noised basis images from the basis images; calculate a weight for each of the noise maps using the target image and the calculated noise maps; and generate a reduced-noise target image using the target image, the calculated noise maps, and the calculated weights.

15 Claims, 17 Drawing Sheets

NOISE REDUCTION IN IMAGE DOMAIN
FOR SPECTRAL COMPUTED
TOMOGRAPHY

FIELD

The exemplary embodiments described herein relate to computed tomography (CT) systems.

BACKGROUND

CT systems and methods are widely used, particularly for medical imaging and diagnosis. CT systems generally create images of one or more sectional slices through a subject's body. A radiation source, such as an X-ray tube, irradiates the body from one side thereof. A collimator, generally adjacent to the X-ray source, limits the angular extent of the X-ray beam, so that radiation impinging on the body is substantially confined to a planar region defining a cross-sectional slice of the body. At least one detector (and generally many more than one detector) on the opposite side of the body receives radiation transmitted through the body substantially in the plane of the slice. The attenuation of the radiation that has passed through the body is measured by processing electrical signals received from the detector.

The development of photon counting (PC) detectors in CT applications has enabled a new dimension of CT imaging, namely "spectral CT" or "multi-energy CT." In a spectral CT system, typically multiple X-ray sources are provided, each having a respective detector positioned opposite thereto such that X-rays may be emitted from each source having different spectral energy content. Once multi-energy data is obtained, a pre-reconstruction decomposition algorithm may be applied in order to image two distinct materials, such as water and iodine. The pre-reconstruction decomposition algorithm may be based on the concept that, in an energy region for medical CT, the X-ray attenuation of any given material can be represented by a proper density mix of two materials with distinct X-ray attenuation properties, referred to as the basis materials. The pre-reconstruction algorithm computes two material density images that represent the equivalent density of one of the basis materials based on the measured projections at high and low X-ray photon energy spectra, respectively. The material density images may be further converted to form monochromatic images, density images, or effective-Z images.

However, noise in the monochromatic images, density images, and effective-Z images is propagated during the decomposition process, and the noise is typically correlated. In other words, noise generated in both low and high kVp acquisitions typically correlates during pre-reconstruction decomposition and propagates in subsequent generation of basis material images.

BRIEF DESCRIPTION OF THE DRAWINGS

A more complete appreciation of the teachings of this disclosure and many of the attendant advantages thereof will be readily obtained as the same becomes better understood by reference to the following detailed description when considered in connection with the accompanying drawings, wherein.

DETAILED DESCRIPTION OF THE
EMBODIMENTS

In one embodiment, there is provided an apparatus comprising processing circuitry configured to: (1) obtain a plurality of basis images that are combined to generate a target image; (2) de-noise the basis images using a noise-reduction method to generate de-noised basis images; (3) calculate noise maps of the basis images by subtracting the de-noised basis images from the basis images; (4) calculate a weight for each of the noise maps using the target image and the calculated noise maps; and (5) generate a reduced-noise target image using the target image, the calculated noise maps, and the calculated weights.

In another embodiment, there is provided a method, comprising (1) obtaining a plurality of basis images that are combined to generate a target image; (2) de-noising the basis images using a noise-reduction method to generate de-noised basis images; (3) calculating noise maps of the basis images by subtracting the de-noised basis images from the basis images; (4) calculating a weight for each of the noise maps using the target image and the calculated noise maps; and (5) generating a reduced-noise target image using the target image, the calculated noise maps, and the calculated weights.

Figure 1:
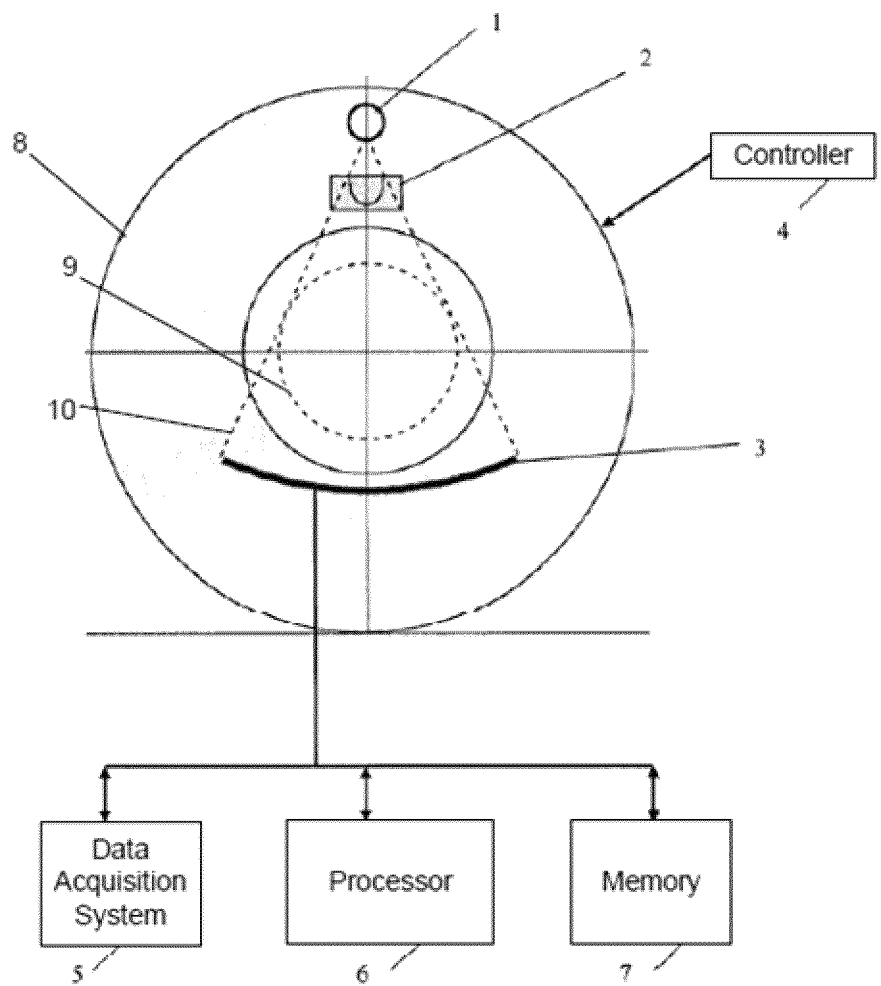
FIGS. 1 and 2 illustrate exemplary CT scanner systems.
Figure 2:
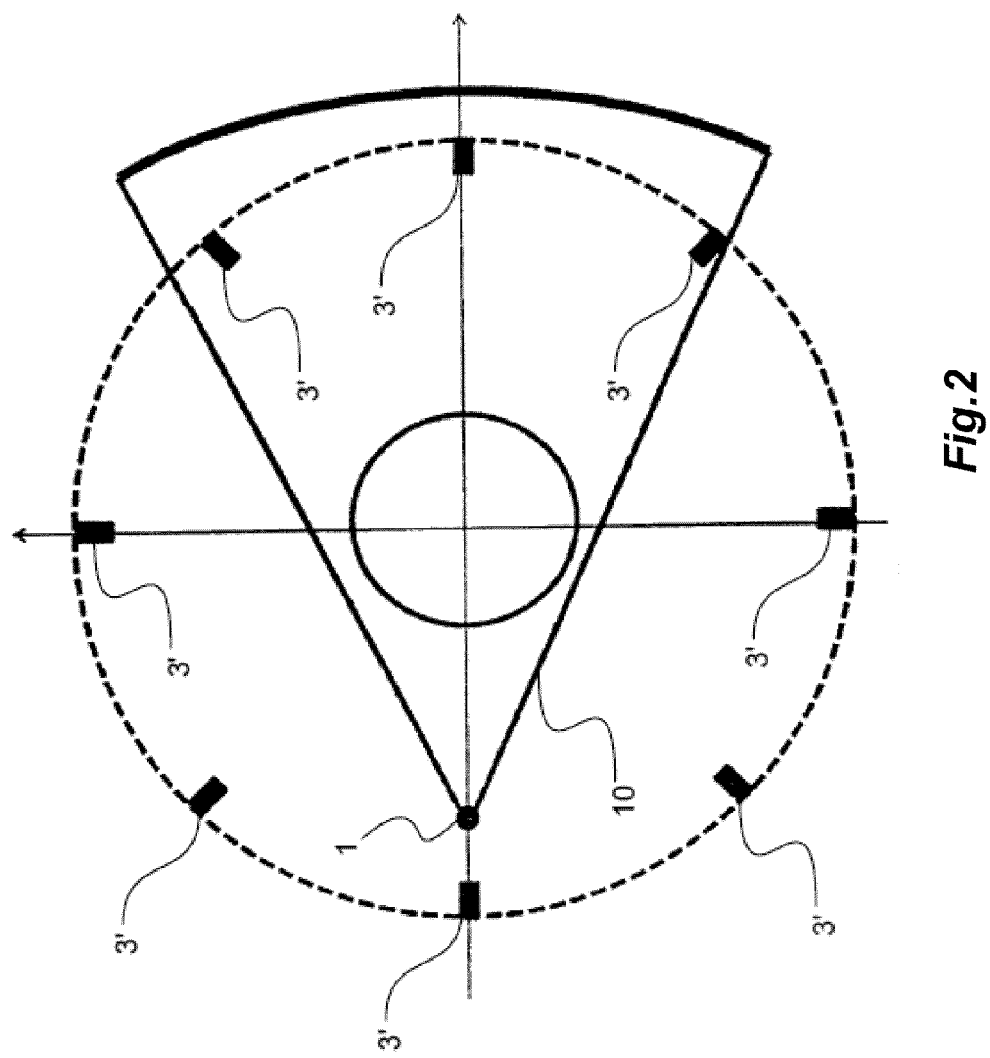

FIG. 1 illustrates a simplified schematic structure of a CT apparatus that can include a detector array to detect photons. Aspects of this disclosure are not restricted to a CT apparatus as the medical imaging system. In particular, the structures and procedures described herein can be applied to other medical imaging systems, and the descriptions provided herein specifically relating to a CT apparatus and the detection of photons should be considered as exemplary. A detector array, a photon detector, and/or a photon detector array may be referred to herein merely as a detector. The CT apparatus illustrated in FIG. 1 includes an X-ray tube 1, filters and collimators 2, and a detector 3. The CT apparatus can also include sparse fixed energy-discriminating (e.g., photon-counting) detectors 3', which can be arranged at a different radius from that of the third-generation detector, as shown in FIG. 2. The CT apparatus also includes additional mechanical and electrical components such as a gantry motor and a controller 4 to control the rotation of the gantry, control the X-ray source, and control a patient bed. The CT apparatus also includes a data acquisition system 5 and a processor 6. The processor 6 is configured to generate CT images based on the projection (view) data acquired by the data acquisition system. For example, the processor 6 includes a reconstruction processor to reconstruct spectral CT images. The processor is programmed to perform methods and execute algorithms in accordance with the processes, algorithms, equations, and relationships described herein. The processor and data acquisition system can make use of a memory 7, which is configured to store, e.g., data obtained from the detector, detector pile-up models, and reconstructed images.

The X-ray tube 1, filters and collimators 2, detector 3, and controller 4 can be provided in a frame 8 that includes a bore. The frame 8 has a general cylindrical or donut shape. In the view shown in FIG. 1, a longitudinal axis of the bore of the frame 8 is in the center of the bore and extends into and out of the page. An interior of the bore, identified as area 9, is a target area for imaging. An object to be scanned, such as a patient, is placed in the target area with, e.g., a patient table. The object can then be irradiated by the X-ray tube 1 with a fan or cone of radiation 10, which generally, substantially or effectively cross-sects the object with respect to the longitudinal axis. The processor 6 is programmed to determine photon counts of captured incident X-ray photons. The data acquisition system 5, the processor 6, and the memory 7 can be implemented as a single machine or computer, or as separate machines or computers that are coupled together or distributed via a network or other data communication system. The controller 4 can also be coupled via the network or other data communication system, and can be implemented by a separate machine or computer, or as part of another machine or computer of the system.

In FIG. 1, the detector 3 is a rotational detector array that rotates with the X-ray tube 1 with respect to the longitudinal axis. Although not shown in FIG. 1, a stationary detector array can also be included, thus providing a rotating detector array and a stationary array, together, in the frame 8. Other detectors can be implemented.

Figure 3:
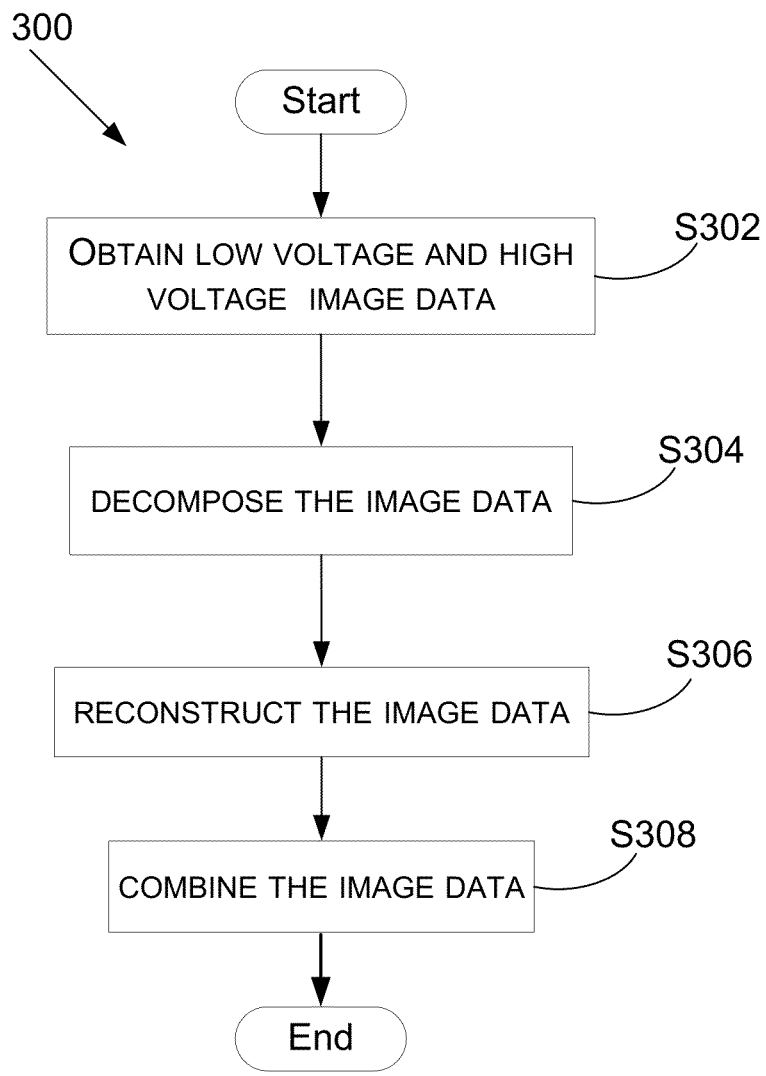
FIG. 3 illustrates a dual energy decomposition method, by way of a flowchart.

Referring to FIG. 3, a flowchart 300 describing a procedure to generate monochromatic images, density images, or effective-Z images in a dual- or multi-energy imaging system is shown.

In step 302, low-voltage data and high-voltage data are obtained by a dual- or multi-energy image system at different tube peak kilovoltage (kVp) levels.

In step 304, the acquired high-voltage and low-voltage data are used for dual-energy decomposition and converted to two sets of projection data.

In step 306, the two sets of projection data are reconstructed to form two basis images: $c_1(x,y)$ and $c_2(x,y)$.

In step 308, the two basis images are combined to form a monochromatic image, a density image, or an effective-Z image of each respective basis material (such as bone, soft tissue), or contrast agent maps (such as water and iodine).

A monochromatic image can be generated according to equation (1):

$$\mu(E,x,y) \approx \mu_1(E)c_1(x,y) + \mu_2(E)c_2(x,y) \quad (1)$$

wherein $c_1(x,y)$ and $c_2(x,y)$ are the basis images, respectively, $\mu_1(E)$ and $\mu_2(E)$ are linear attenuation coefficients of basis materials 1 and 2, and E is an energy variable.

The density image can be generated according to equations (2) and (3):

$$\rho_{map} = \frac{1000}{\rho_{H_2O}}(\rho - \rho_{H_2O}) \quad (2)$$

$$\rho(x,y) = \rho_1 c_1(x,y) + \rho_2 c_2(x,y) \quad (3)$$

wherein $c_1(x,y)$ and $c_2(x,y)$ are the basis images, respectively.

The effective-Z image can be generated according to equations (4) and (5):

$$Z_{map} = \frac{1000}{Z_{H_2O}}(Z_{eff} - Z_{H_2O}) \quad (4)$$

$$Z_{eff}(x,y) = \left[\frac{\rho_1 c_1(x,y) Z_1^{4.4} + \rho_2 c_2(x,y) Z_2^{4.4}}{\rho_1 c_1(x,y) + \rho_2 c_2(x,y)}\right]^{1/4.4} \quad (5)$$

wherein $c_1(x,y)$ and $c_2(x,y)$ are the basis images, respectively.

Figure 4A:
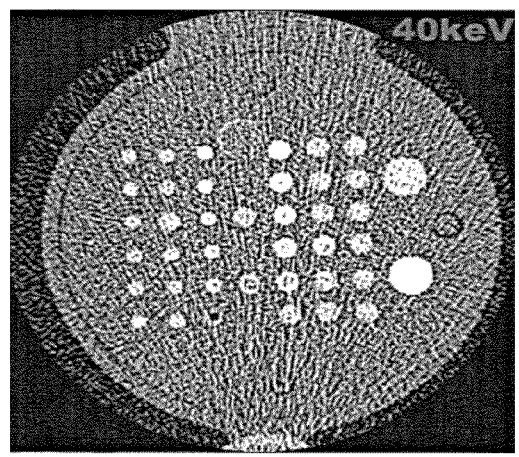
FIG. 4A, FIG. 4B, and FIG. 4C shows exemplary monochromatic images at 40 keV, 135 keV, and 60 keV.
Figure 4B:
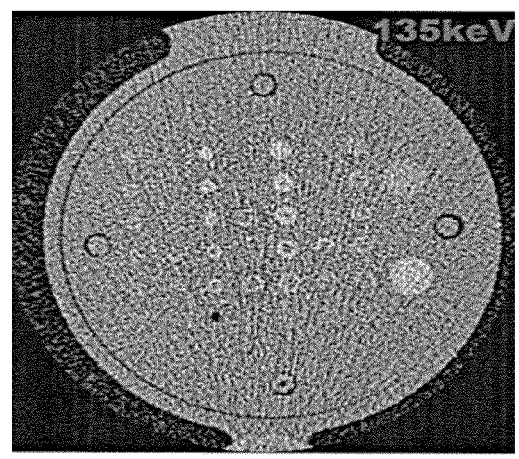
Figure 4C:
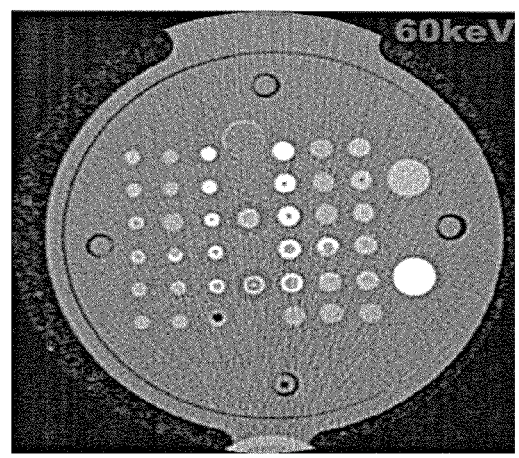

However, after the reconstruction, the noise is higher in the basis images, density images, effective-Z images, and most monochromatic images, than in polychromatic images. Monochromatic images represent voxels as if they had been imaged with a beam of only a single energy, e.g., 70 keV. At an optimal monochromatic energy, the noise level in a monochromatic image is lower than in polychromatic images. As shown in FIGS. 4A-4C, the images generated with a pre-reconstruction decomposition generally contain high noise, such as monochromatic data images at 40 keV and at 135 keV. However, monochromatic images at an optimal energy, e.g., 60 keV, show relatively low noise, which indicates the noise correlation in the basis images, since the monochromatic images are linear combinations of the basis images.

Therefore, it is desirable to have a system and method that presents diagnostic imaging data having minimized noise in computed monochromatic images, density images, and effective-Z images.

Figure 5:
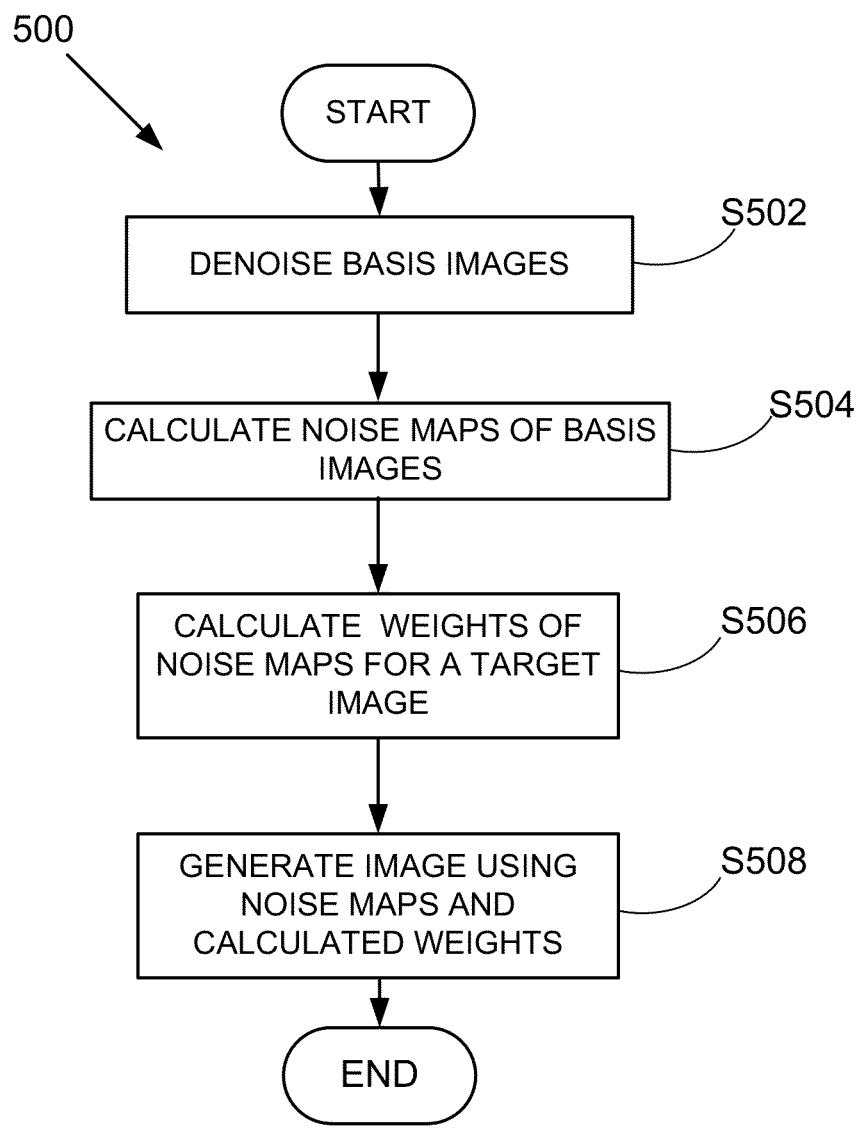
FIG. 5 illustrates a noise reduction process, by way of a flowchart.
Figure 6A:
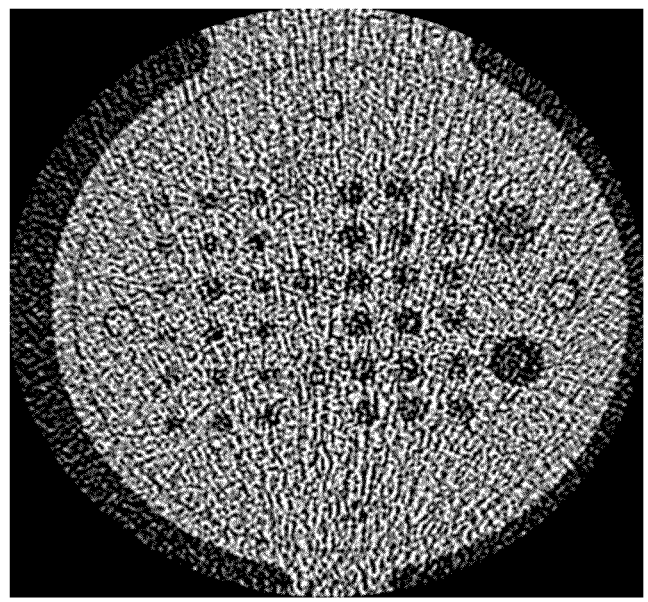
FIG. 6A and FIG. 6B show an exemplary original water basis image and an exemplary de-noised water basis image, respectively.
Figure 6B:
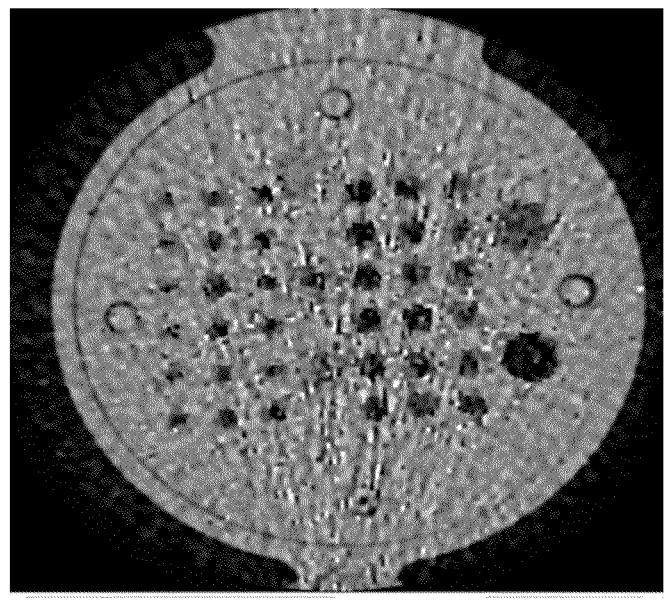
Figure 7A:
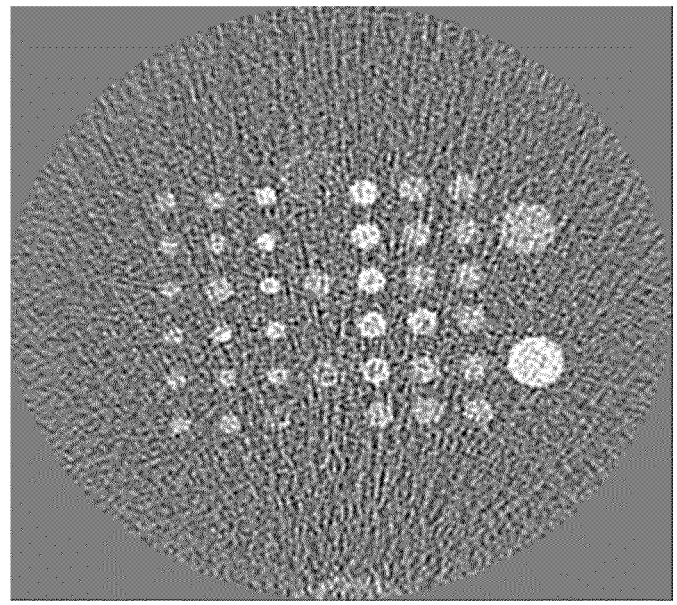
FIG. 7A and FIG. 7B show an exemplary original bone basis image and an exemplary de-noised bone basis image, respectively.
Figure 7B:
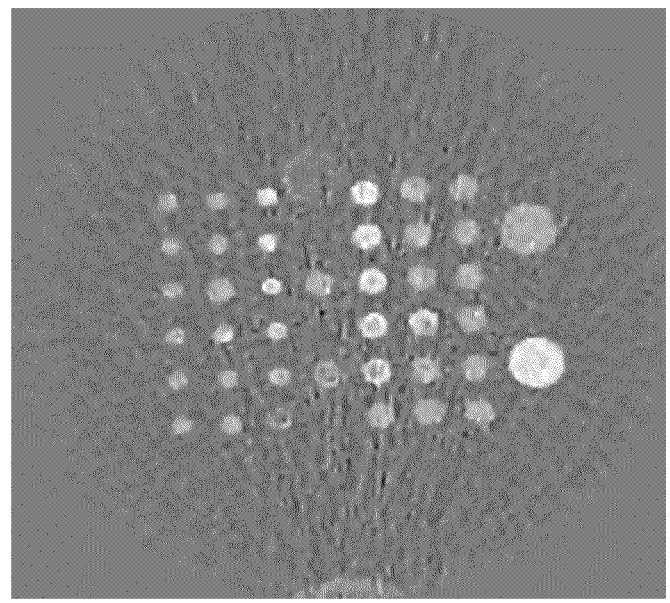
Figure 8A:
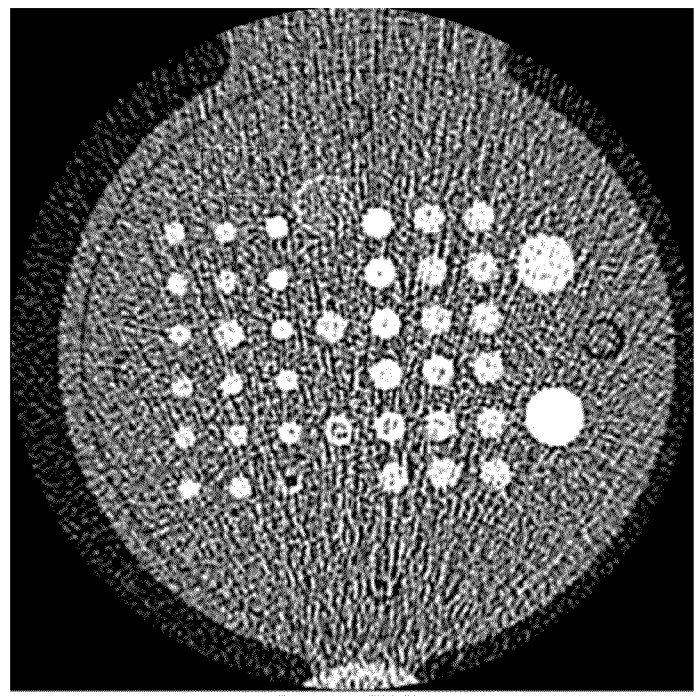
FIG. 8A and FIG. 8B show an exemplary original monochromatic image and an exemplary de-noised monochromatic image at 40 keV, respectively.
Figure 8B:
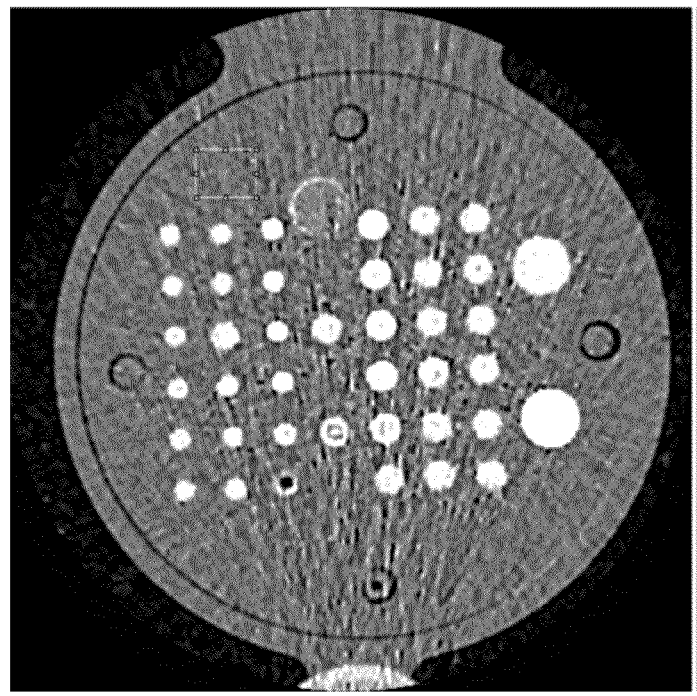
Figure 9A:
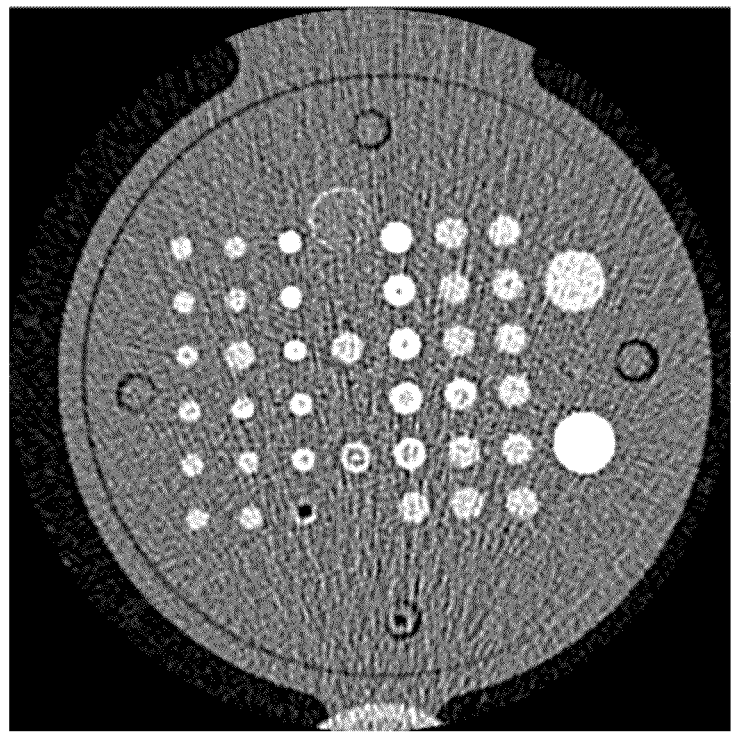
FIG. 9A and FIG. 9B show an exemplary original monochromatic image and an exemplary de-noised monochromatic image at 50 keV, respectively.
Figure 9B:
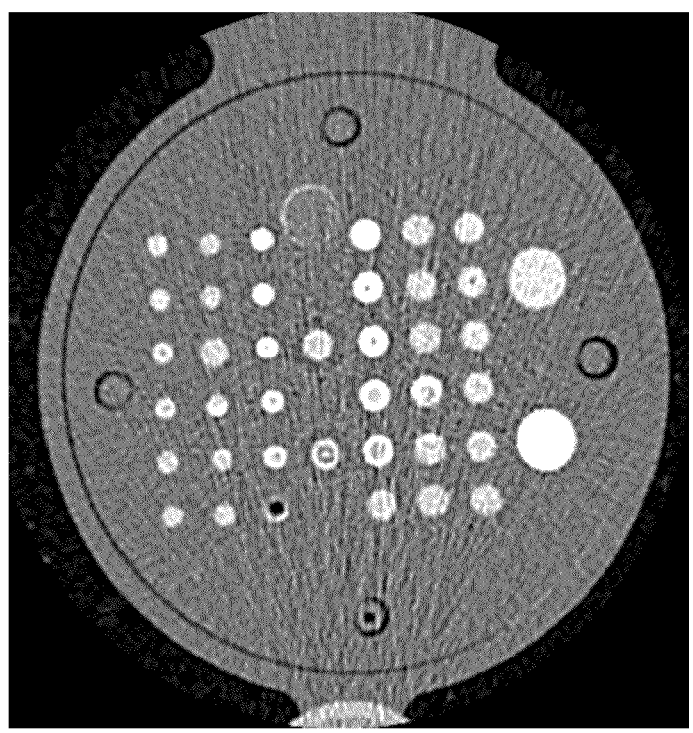
Figure 10A:
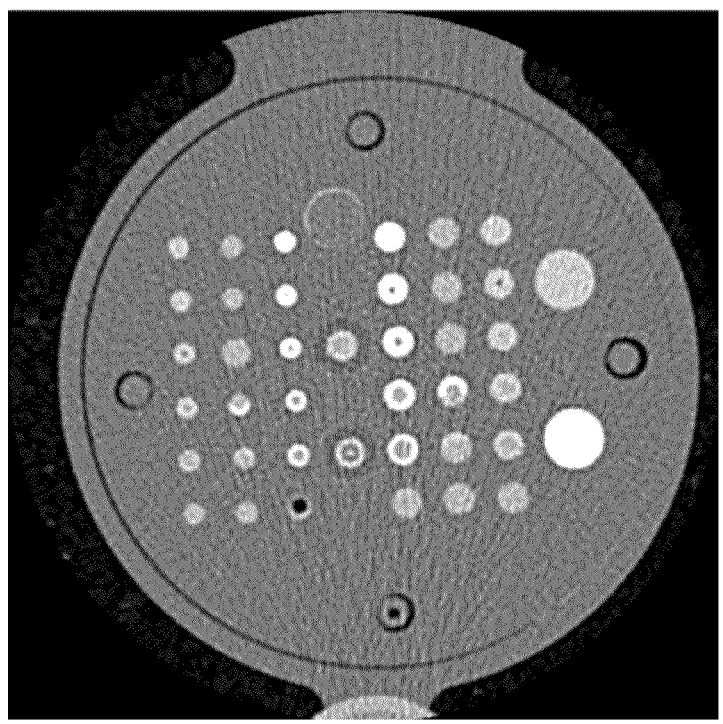
FIG. 10A and FIG. 10B show an exemplary original monochromatic image and an exemplary de-noised monochromatic image at 60 keV, respectively.
Figure 10B:
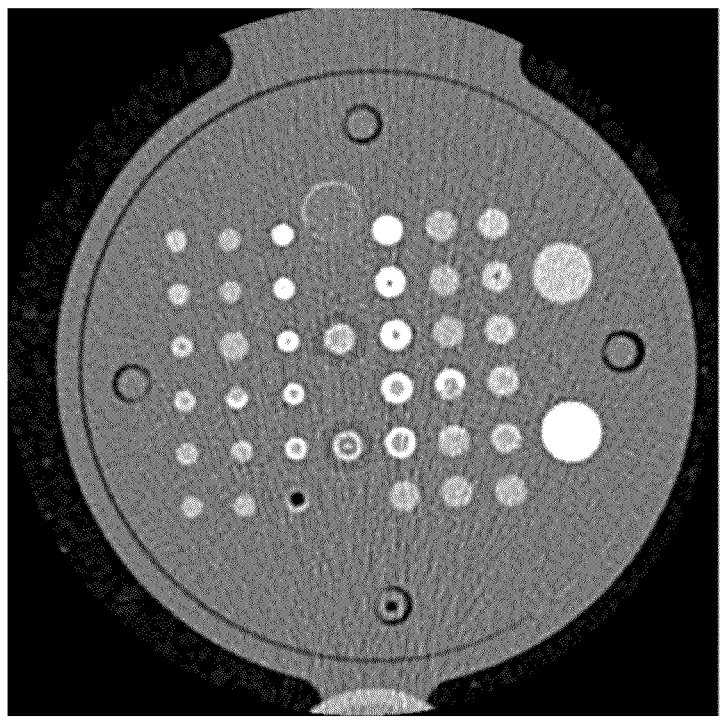
Figure 11A:
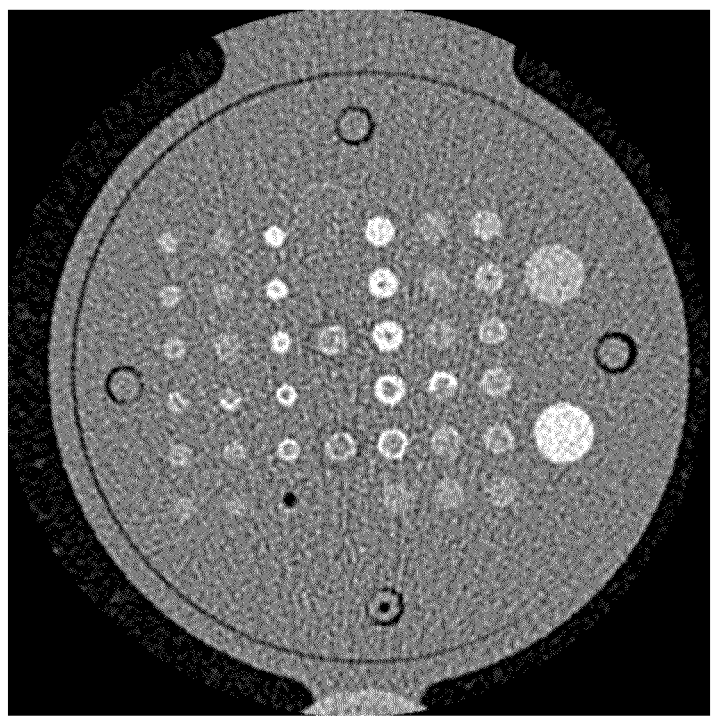
FIG. 11A and FIG. 11B show an exemplary original monochromatic image and an exemplary de-noised monochromatic image at 80 keV, respectively.
Figure 11B:
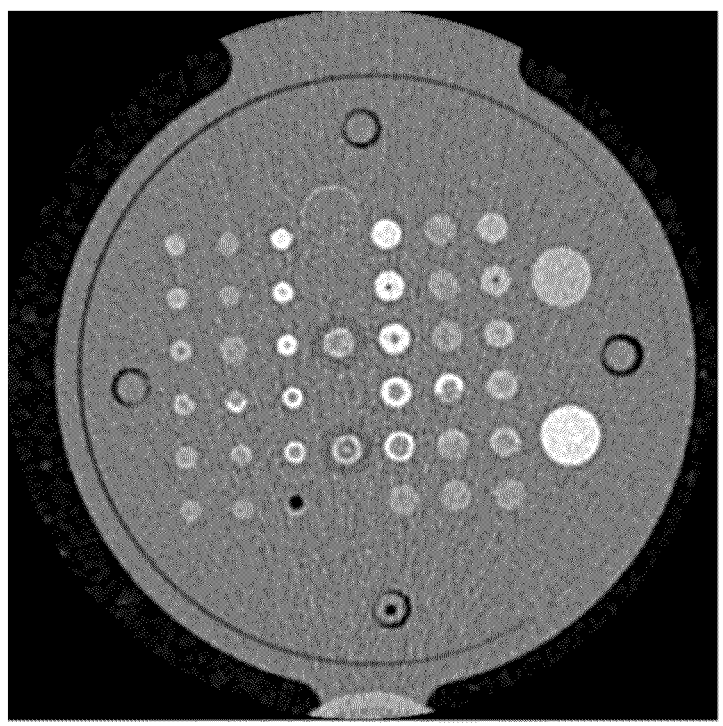
Figure 12A:
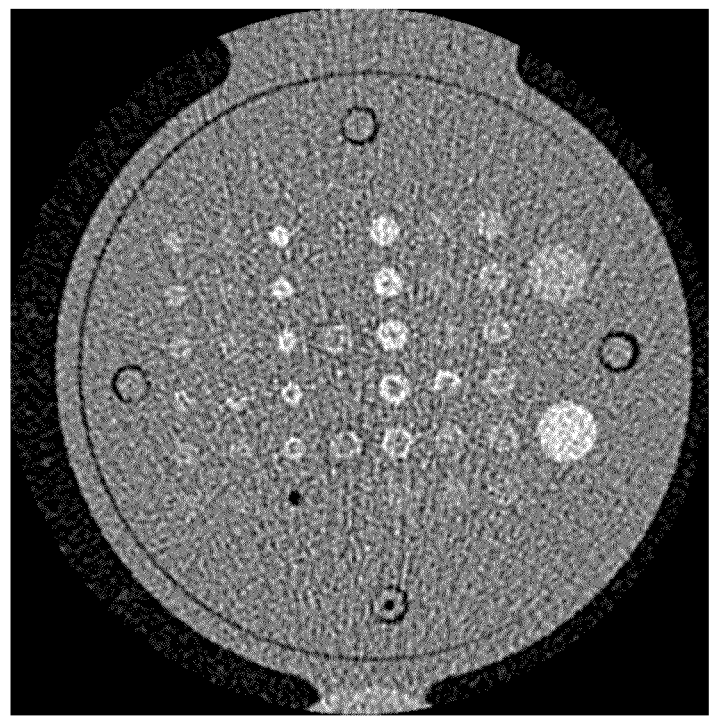
FIG. 12A and FIG. 12B show an exemplary original monochromatic image and an exemplary de-noised monochromatic image at 100 keV, respectively.
Figure 12B:
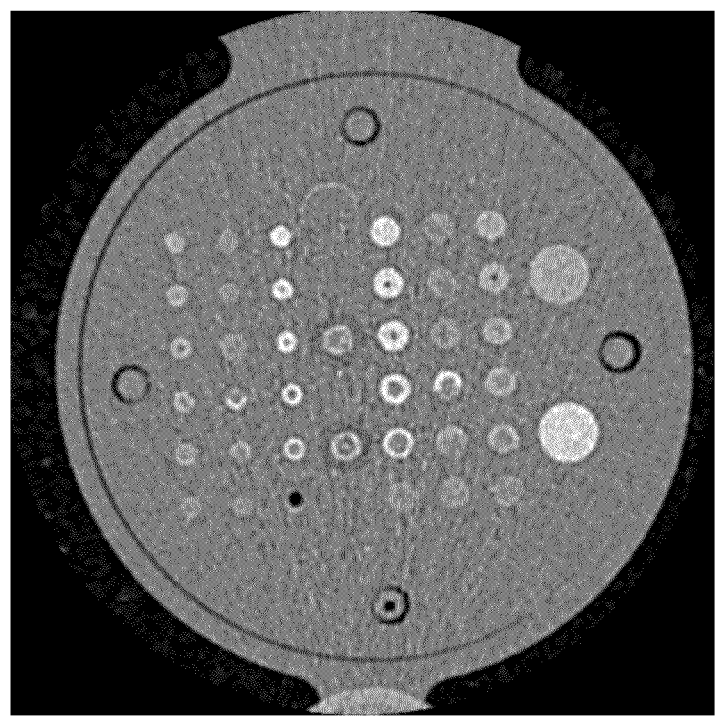
Figure 13A:
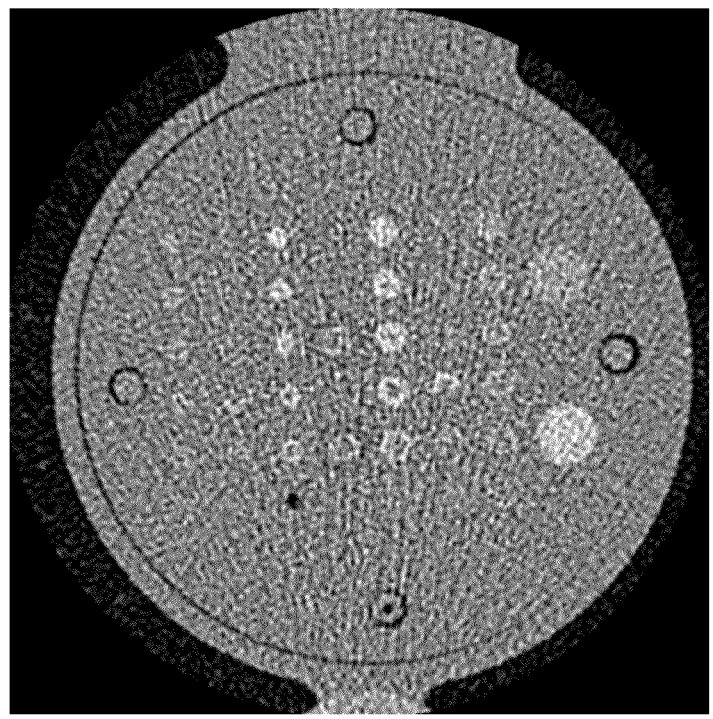
FIG. 13A and FIG. 13B show an exemplary original monochromatic image and an exemplary de-noised monochromatic image at 135 keV, respectively.
Figure 13B:
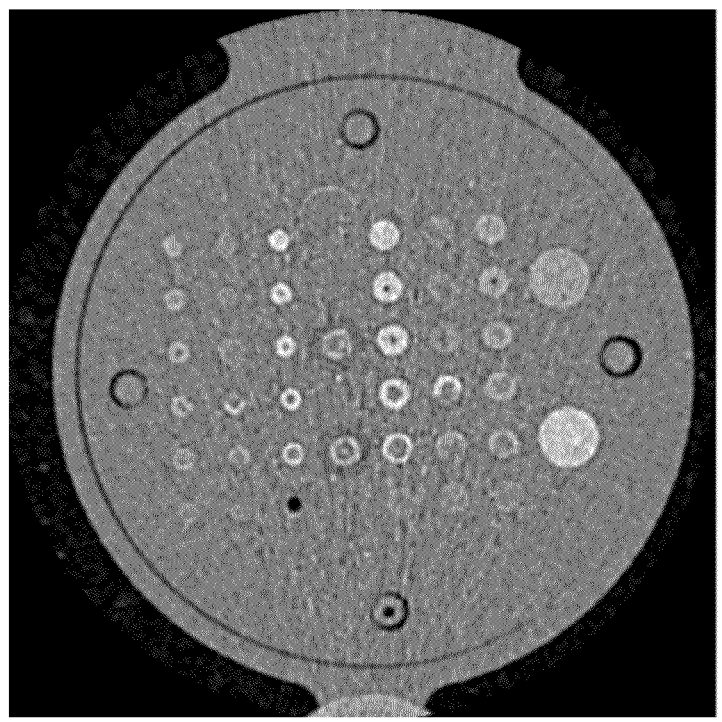

Referring to FIG. 5, a flowchart 500 describing a method for reducing noise in monochromatic images, basis images, density images, and effective-Z images is shown.

In step 502, the processing circuitry de-noises the original basis images with a noise reduction method, e.g., discrete total variation minimization (DTV).

In step 504, the processing circuitry calculates noise maps of the basis images by subtracting the de-noised basis images from the original basis images.

In step 506, the processing circuitry calculates global weights of the noise maps for a given image (monochromatic, density, effective-Z, or basis image) by minimizing the total amplitude or total variation.

In step 508, the processing circuitry generates a reduced-noise image using the noise maps and the weights calculated in step 506.

Steps 502-508 are described in more detail below.

In one embodiment, the input basis images have pixel data with coordinates (i,j). n sets of basis images $c_n(i,j)$ are obtained by the CT system and n sets of de-noised basis images $\overline{c}_n(i,j)$ are obtained through applying a noise reduction method, e.g., discrete total variation (DTV) minimization, to $c_n(i,j)$.

For example, the DTV minimization method applied to the basis images includes using a set of predetermined values respectively indicating an increase, a decrease, and an unknown in a gradient direction of total variation at a given pixel of an image, the method including the steps of: (1) initializing a direction index to the unknown for each of the image pixels; (2) determining a discrete gradient of the total variation for each of the image pixels, the discrete gradient indicating the increase, the decrease, or the unknown; (3) updating the direction index of each of the image pixels with the discrete gradient if the direction index is the unknown; (4) changing a pixel value of each of the image pixels by a predetermined value to reduce the total variation if the direction index and the discrete gradient are equal in the gradient direction for one of the image pixels; and (5) repeating the steps (2)-(4) until a certain predetermined condition is reached.

In one embodiment, the certain predetermined condition is that the direction index and the discrete gradient are different in the gradient direction for each of the image pixels. In another embodiment, the certain predetermined condition is a predetermined number of repetitions of the steps (2)-(4).

Thus, the noise maps of $c_n(i,j)$ can be generated according to equation (6):

$$\text{Noise}(c_n(i,j)) = c_n(i,j) - \overline{c_n}(i,j) \tag{6}$$

Further, for a given image $f(i,j)$ combined from the basis images $c_n(i,j)$, the de-noised image $\tilde{f}(i,j)$ is generated using equation (7):

$$\tilde{f}(i,j) = f(i,j) + \sum_{n=1}^{N} \beta_n \text{Noise}(c_n(i,j)) \tag{7}$$

wherein $(i,j)$ are the coordinates of a pixel in the image, $\beta_n$ are weights of the noise map. An example $\beta_n$ obtained from a total amplitude variation minimization method is defined in equation (8):

$$\beta_n = \arg\min\{\Sigma_{i,j} |f(i,j) + \Sigma_{n=1}^{N} \beta_n \text{Noise}(c_n(i,j))|\} \tag{8}$$

Total variation minimization may also be used to calculate $\beta_n$.

In particular, define a cost function as:

$$\psi(\beta_1, \beta_2 \ldots \beta_N) = \sum_{i,j} \left| f(i,j) + \sum_{n=1}^{N} \beta_n \text{Noise}(c_n(i,j)) \right|.$$

Its gradient can be written as $$\frac{\partial \psi(\beta_1, \beta_2 \ldots \beta_N)}{\partial \beta_n} = \sum_{i,j} \text{Noise}(c_n(i,j)) \text{sgn}\left( f(i,j) + \sum_{n'=1}^{N} \beta_{n'} \text{Noise}(c_{n'}(i,j)) \right).$$

The weights $\beta_n$ can be calculated iteratively by $$\beta_n^{(k+1)} = \beta_n^{(k)} - \alpha \frac{\partial \psi(\beta_1, \beta_2 \ldots \beta_N)}{\partial \beta_n},$$

wherein $\alpha$ is a constant that is small enough such that $$\psi(\beta_1^{(k+1)}, \beta_2^{(k+1)} \ldots \beta_N^{(k+1)}) < \psi(\beta_1^{(k)}, \beta_2^{(k)} \ldots \beta_N^{(k)}).$$

We assume $\beta_n^{(0)} = 0$.

The image $f(i,j)$ can be a monochromatic, density, effective-Z, or basis image.

FIGS. 6A, 6B, 7A, 7B, 15A, 15B, 16A, and 16B illustrate the de-noised water basis image, bone basis image, density image, and effective-Z image generated from the above-described de-noise approach in comparison with an original image, respectively.

FIGS. 8A-13B illustrate the de-noised monochromatic images generated from the above-described de-noise approach in comparison with an original image at 40 keV, 50 keV, 60 keV, 80 keV, 100 keV, and 135 keV, respectively.

Figure 14:
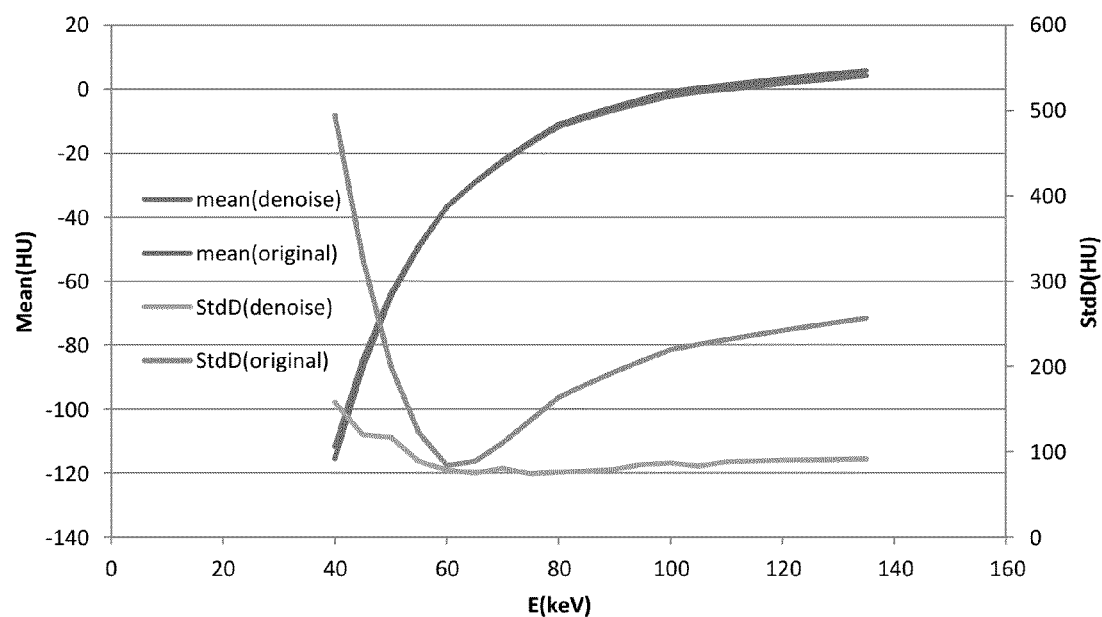
FIG. 14 illustrates a mean and a standard deviation for monochromatic images at different energy levels.
Figure 15:
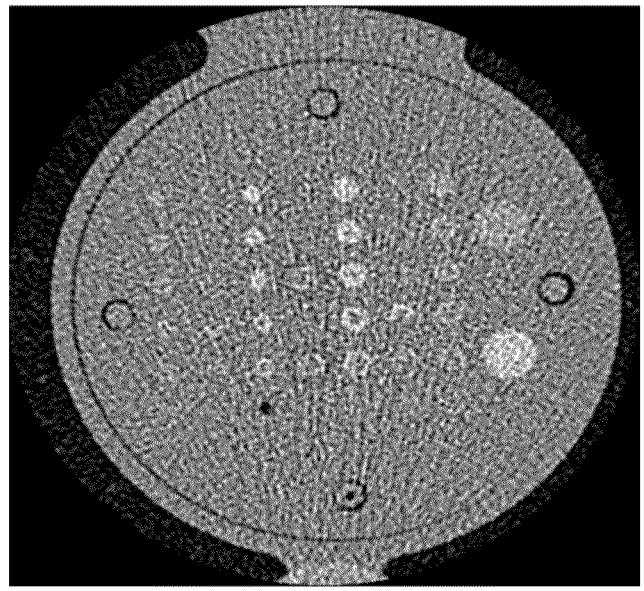
FIG. 15A and FIG. 15B show an exemplary original density image and an exemplary de-noised density image, respectively.
Figure 15:
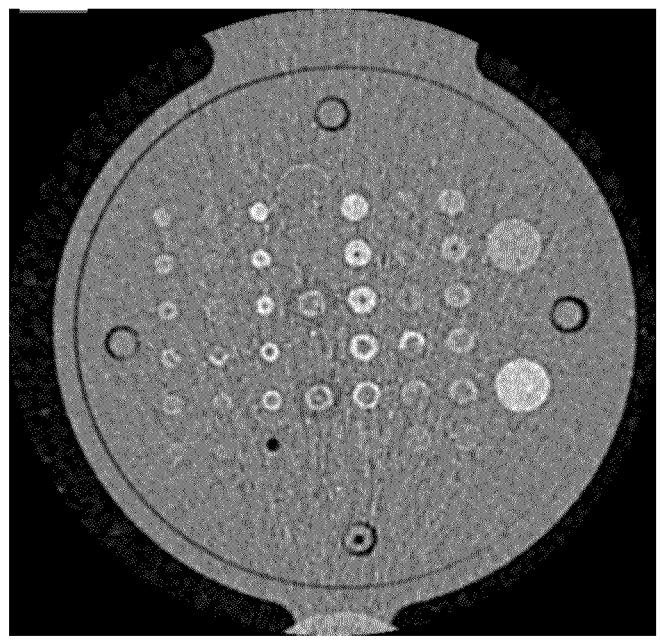
Figure 16A:
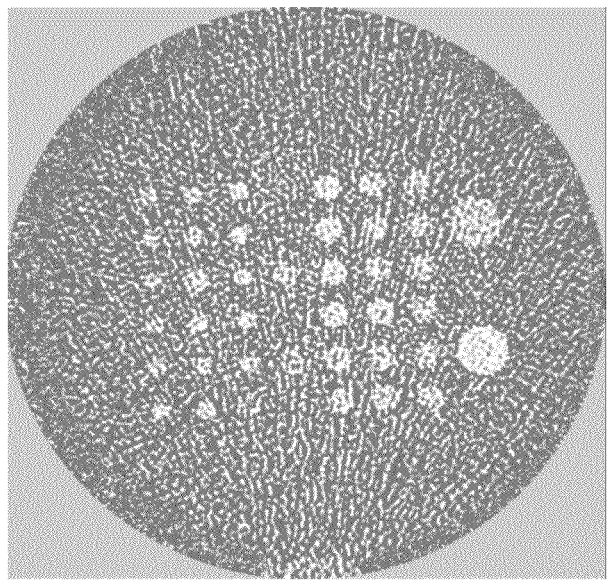
FIG. 16A and FIG. 16B show an exemplary original effective-Z image and an exemplary de-noised effective-Z image, respectively.
Figure 16B:
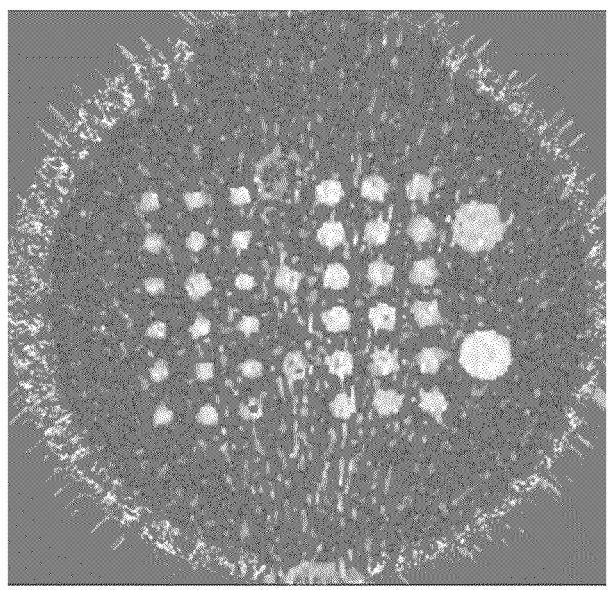

FIG. 14 illustrates mean and standard deviation for monochromatic images at different energy levels in comparison with an original image. The above-described de-noise approach results in an image with reduced noise compared to an original image. For monochromatic images, both the mean and the standard deviation of the de-noised images show less noise than the mean and the standard deviation of the original images as illustrated in FIG. 14. Compared with a general de-noise method in the image domain, the disclosed methods can preserve edges better. Since the image quality of the de-noised monochromatic images is better than the image quality of de-noised basis images, density images, and effective-Z images, the energy dependence feature can be used to differentiate materials. For low-contrast differentiation, the monochromatic image with the lowest noise is obtained at, e.g. 65 keV. Therefore, monochromatic images at low energy may be used for contrast differentiation. Total amplitude (TA) minimization and total variation (TV) minimization are compared in weight determination. The TA minimization is generally more stable.

Figure 17:
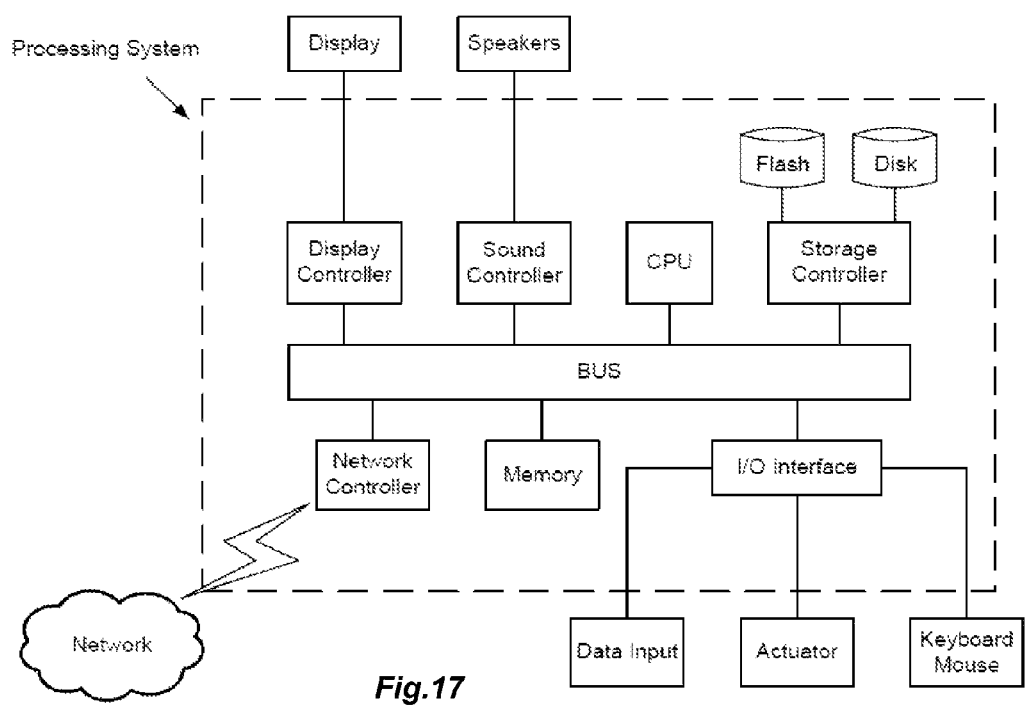
FIG. 17 shows a schematic diagram of an exemplary processing system.

An exemplary processing system is illustrated in FIG. 17, which is an exemplary implementation of the processor 6 of FIG. 1. The processor 6 is a hardware device, e.g., a CPU that has been specifically configured to execute one or more computer programs that cause the CPU to perform the functions illustrated in the flowcharts of FIG. 5. In particular, this exemplary processing system can be implemented using one or more microprocessors or the equivalent, such as a central processing unit (CPU) and/or at least one application-specific processor ASP (not shown). A microprocessor is a hardware circuit or circuitry that utilizes a computer readable storage medium, such as a memory circuit (e.g., ROM, EPROM, EEPROM, flash memory, static memory, DRAM, SDRAM, and their equivalents), configured to control the microprocessor to perform and/or control the processes and systems of this disclosure, and configured to execute the algorithms described herein. Other storage mediums can be controlled via a controller, such as a disk controller, which can controls a hard disk drive or optical disk drive.

The microprocessor or aspects thereof, in alternate implementations, can include or exclusively include a logic device for augmenting or fully implementing aspects of this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU and a graphics processing unit (GPU) to achieve improved computational efficiency. One or more processors in a multi-processing arrangement may also be employed to execute sequences of instructions contained in memory. Alternatively, hard-wired circuitry may be used in place of or in combination with software instructions. Thus, the exemplary implementations discussed herein are not limited to any specific combination of hardware circuitry and software.

In another aspect, results of processing in accordance with this disclosure can be displayed via a display controller to a monitor. The display controller preferably includes at least one graphic processing unit, which can be provided by a plurality of graphics processing cores, for improved computational efficiency. Additionally, an I/O (input/output) interface is provided for inputting signals and/or data from microphones, speakers, cameras, a mouse, a keyboard, a touch-based display or pad interface, etc., which can be connected to the I/O interface as a peripheral. For example, a keyboard or a pointing device for controlling parameters of the various processes or algorithms of this disclosure can be connected to the I/O interface to provide additional functionality and configuration options, or control display characteristics. Moreover, the monitor can be provided with a touch-sensitive interface for providing a command/instruction interface.

The above-noted components can be coupled to a network, such as the Internet or a local intranet, via a network interface for the transmission or reception of data, including controllable parameters. A central BUS is provided to connect the above hardware components together and provides at least one path for digital communication there between.

The data acquisition system 5, the processor 6, and the memory 7 of FIG. 1 can be implemented utilizing one or more processing systems in accordance with the exemplary implementation shown in FIG. 17. In particular, circuitry, one or more circuits or computer hardware units coinciding with one or more of the devices illustrated in FIG. 17 can provide for the functions of the data acquisition system 5, the processor 6, and the memory 7 (collectively or separately). The functional processing described herein can also be implemented in specialized circuitry or one or more specialized circuits including circuits to perform the described processing. Such circuits can be a part of a computer processing system or a discrete device that is interconnected to other systems. A processor in accordance with this disclosure can also be programmed to or configured to execute the functional processing described herein by computer code elements.

Further, the processing systems, in one implementation, can be connected to each other by a network or other data communication connection. One or more of the processing systems can be connected to corresponding actuators to actuate and control movement of the gantry, the X-ray source, and/or the patient bed.

Suitable software can be tangibly stored on a computer readable medium of a processing system, including the memory and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes and complete executable programs. Moreover, parts of the processing of aspects of this disclosure may be distributed for better performance, reliability and/or cost.

The data input portion of the processing system accepts input signals from a detector or an array of detectors by, e.g., respective wired connections. A plurality of ASICs or other data processing components can be provided as forming the data input portion, or as providing input(s) to the data input portion. The ASICs can receive signals from, respectively, discrete detector arrays or segments (discrete portions) thereof. When an output signal from a detector is an analog signal, a filter circuit can be provided, together with an analog-to-digital converter for data recording and processing uses. Filtering can also be provided by digital filtering, without a discrete filter circuit for an analog signal. Alternatively, when the detector outputs a digital signal, digital filtering and/or data processing can be performed directly from the output of the detector.

While certain implementations have been described, these implementations have been presented by way of example only, and are not intended to limit the scope of this disclosure. The novel devices, systems and methods described herein may be embodied in a variety of other forms; furthermore, various omissions, substitutions, and changes in the form of the devices, systems and methods described herein may be made without departing from the spirit of this disclosure. The accompanying claims and their equivalents are intended to cover.

The invention claimed is:

1. An apparatus, comprising:
processing circuitry configured to
obtain a plurality of basis images that are combined to generate a target image;
de-noise the basis images using a noise-reduction method to generate de-noised basis images;
calculate noise maps of the basis images by subtracting the de-noised basis images from the basis images;
calculate a weight for each of the noise maps using the target image and the calculated noise maps; and
generate a reduced-noise target image using the target image, the calculated noise maps, and the calculated weights.

2. The apparatus of claim 1, wherein the processing circuitry is further configured to calculate the weights using a total amplitude variation minimization method.

3. The apparatus of claim 1, wherein the processing circuitry is further configured to generate the reduced-noise target image by adding a weighted sum of the calculated weights and the corresponding noise maps to the target image.

4. The apparatus of claim 1, wherein the processing circuitry is configured to generate the reduced-noise target image, which is a monochromatic image.

5. The apparatus of claim 1, wherein the processing circuitry is configured to generate the reduced-noise target image, which is a basis image.

6. The apparatus of claim 1, wherein the processing circuitry is configured to generate the reduced-noise target image, which is a density image.

7. The apparatus of claim 1, wherein the processing circuitry is configured to generate the reduced-noise target image, which is an effective-Z image.

8. An imaging method, comprising:
obtaining a plurality of basis images that are combined to generate a target image;
de-noising the basis images using a noise-reduction method to generate de-noised basis images;
calculating noise maps of the basis images by subtracting the de-noised basis images from the basis images;
calculating a weight for each of the noise maps using the target image and the calculated noise maps; and
generating a reduced-noise target image using the target image, the calculated noise maps, and the calculated weights.

9. The method of claim 8, wherein the de-noising step comprises de-noising the basis images using a total amplitude variation minimization method.

10. The method of claim 8, wherein the generating step comprises generating the reduced-noise target image by adding a weighted sum of the calculated weights and the corresponding noise maps to the target image.

11. The method of claim 8, wherein the step of generating the reduced-noise image comprises generating the reduced-noise target image, which is a monochromatic image.

12. The method of claim 8, wherein the step of generating the reduced-noise image comprises generating the reduced-noise target image, which is a basis image.

13. The method of claim 8, wherein the step of generating the reduced-noise image comprises generating the reduced-noise target image, which is a density image.

14. The method of claim 8, wherein the step of generating the reduced-noise image comprises generating the reduced-noise target image, which is an effective-Z image.

15. A non-transitory computer-readable medium storing executable instructions, which when executed by a computer processor, cause the computer processor to execute a method comprising:

- obtaining a plurality of basis images that are combined to generate a target image;
- de-noising the basis images using a noise-reduction method to generate de-noised basis images;
- calculating noise maps of the basis images by subtracting the de-noised basis images from the basis images;
- calculating a weight for each of the noise maps using the target image and the calculated noise maps; and
- generating a reduced-noise target image using the target image, the calculated noise maps, and the calculated weights.

* * * * *